US011738947B2

(12) United States Patent
Raizer et al.

(10) Patent No.: US 11,738,947 B2
(45) Date of Patent: Aug. 29, 2023

(54) METHOD FOR PREDICTING ENERGY CONSUMPTION OF MOTORS

(71) Applicant: BionicHIVE Ltd., Moshav ein Habsor (IL)

(72) Inventors: Liran Raizer, Moshav ein Hansor (IL); Olivier Haddad, Kfar Yona (IL)

(73) Assignee: BIONICHIVE LTD., Moshav ein Habsor (IL)

( * ) Notice: Subject to any disclaimer, the term of this patent is extended or adjusted under 35 U.S.C. 154(b) by 457 days.

(21) Appl. No.: 16/956,695

(22) PCT Filed: Dec. 24, 2018

(86) PCT No.: PCT/IL2018/051386
§ 371 (c)(1),
(2) Date: Jun. 22, 2020

(87) PCT Pub. No.: WO2019/130298
PCT Pub. Date: Jul. 4, 2019

(65) Prior Publication Data
US 2020/0324970 A1 Oct. 15, 2020

Related U.S. Application Data

(60) Provisional application No. 62/612,453, filed on Dec. 31, 2017.

(51) Int. Cl.
*G06F 16/29* (2019.01)
*B65G 1/04* (2006.01)
(Continued)

(52) U.S. Cl.
CPC ......... *B65G 1/0492* (2013.01); *G01C 21/206* (2013.01); *G05D 1/0027* (2013.01);
(Continued)

(58) Field of Classification Search
CPC ...... G05D 2201/0216; G05B 19/41895; Y02P 90/02; B07C 2501/0063; B60L 2260/54; B65G 1/0492
See application file for complete search history.

(56) References Cited

U.S. PATENT DOCUMENTS 5,913,917 A 6/1999 Murphy
9,613,940 B2 4/2017 Yu
(Continued)

FOREIGN PATENT DOCUMENTS

WO WO-2016009423 A1 * 1/2016 ............... B65G 1/04

OTHER PUBLICATIONS

Amir Bozorgi et al., A Time and Energy Efficient Routing Algorithm for Electric Vehicles based on Historical Driving Data, IEEE Transactions on Intelligent Vehicles, vol. 2, No. 4, pp. 308-320, Dec. 2017 (14 pages).

(Continued)

*Primary Examiner* — Kenneth J Malkowski
(74) *Attorney, Agent, or Firm* — Roach Brown McCarthy & Gruber, P.C.; Kevin D. McCarthy

(57) ABSTRACT

Presented is a method for predicting the energy consumption of electric motors and using these predictions as one of the factors in planning tasks that are carried out with the assistance of the motors. The method can be used for assigning tasks to robots in an automatic system for picking and placing boxes on shelves in a warehouse. Another application of the method is selecting the most energetically efficient route from several alternative routes for passenger and commercial vehicles comprising battery powered propulsion systems that include electric motors and on-board computers.

5 Claims, 10 Drawing Sheets

(51) Int. Cl.
  *H02J 7/00*    (2006.01)
  *G01C 21/20*   (2006.01)
  *G05D 1/00*    (2006.01)
  *G05D 1/02*    (2020.01)
  *G06Q 10/087*  (2023.01)
  *G06Q 50/28*   (2012.01)

(52) U.S. Cl.
  CPC ........... *G05D 1/0225* (2013.01); *G06F 16/29* (2019.01); *G06Q 10/087* (2013.01); *H02J 7/0048* (2020.01); *G05D 2201/0216* (2013.01); *G06Q 50/28* (2013.01)

(56) References Cited

U.S. PATENT DOCUMENTS

| | | |
|---|---|---|
| 2010/0217437 A1 | 8/2010 | Sarh et al. |
| 2014/0214267 A1 | 7/2014 | Sellschopp |
| 2014/0278617 A1* | 9/2014 | Kaufman ............... G06Q 50/06 705/7.11 |
| 2014/0362598 A1* | 12/2014 | Racicot ............... B60Q 1/2657 362/542 |
| 2014/0365258 A1 | 12/2014 | Vestal et al. |
| 2015/0278404 A1 | 10/2015 | Embon et al. |
| 2016/0009423 A1 | 1/2016 | Steel |
| 2016/0129592 A1 | 5/2016 | Saboo et al. |
| 2017/0158430 A1 | 6/2017 | Raizer |

OTHER PUBLICATIONS

International Search Report for PCT/IL2018/051386, dated Mar. 28, 2019 (6 pages).
Written Opinion of the International Searching Authority for PCT/IL2018/051386, dated Mar. 28, 2019 (5 pages).

\* cited by examiner

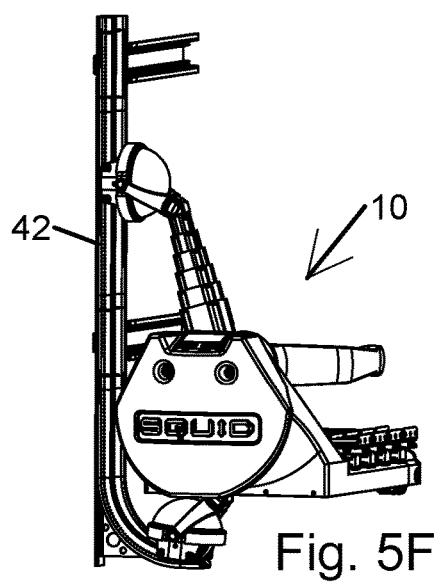
Fig. 5F
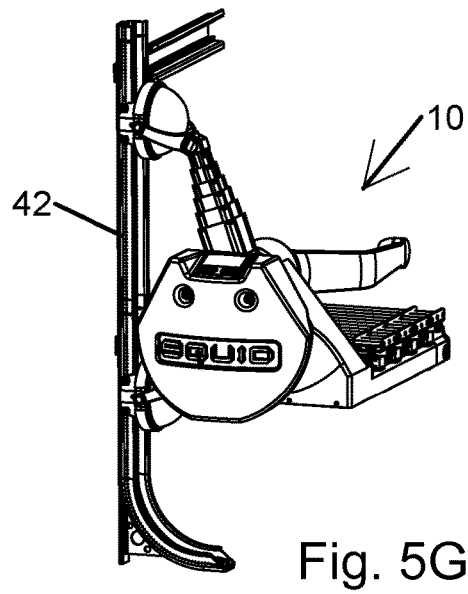
Fig. 5G
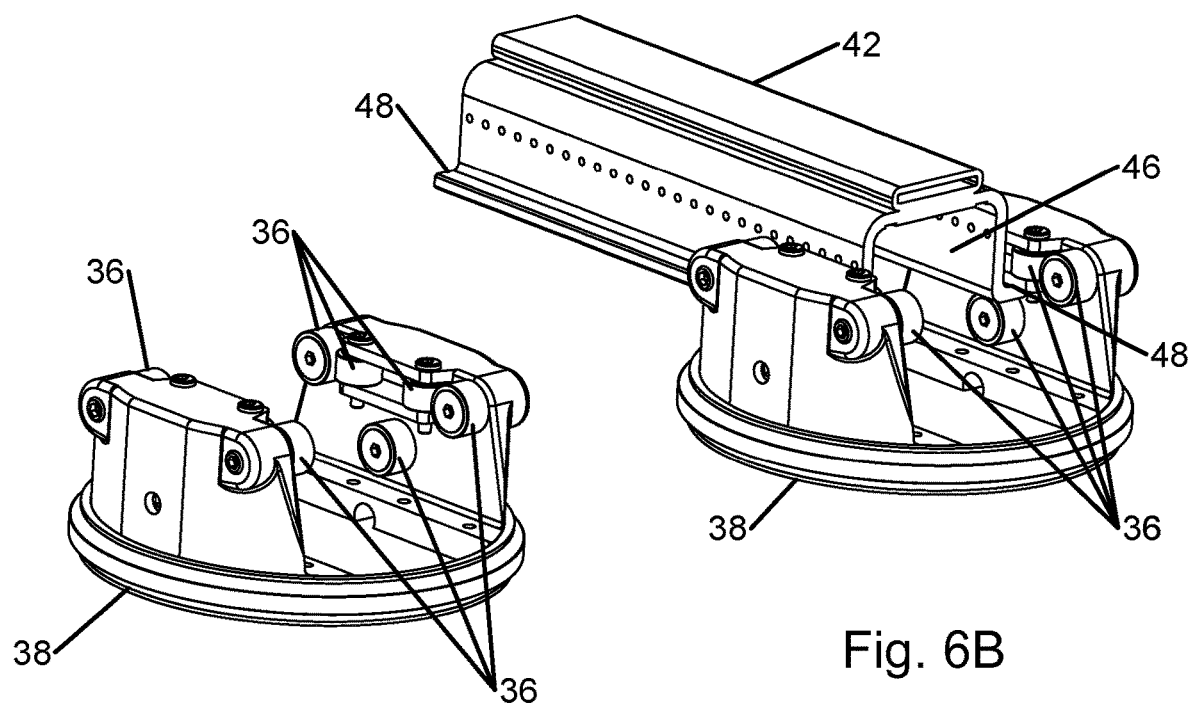
Fig. 6A
Fig. 6B

METHOD FOR PREDICTING ENERGY CONSUMPTION OF MOTORS

FIELD OF THE INVENTION

The present invention relates to the field of management of the energy consumption of motors. Specifically, the invention relates to a method of optimization of task performance of an electric motor based on task specific parameters.

BACKGROUND OF THE INVENTION

As energy use increases globally, the non-renewable energy sources of the planet rapidly diminish and become less accessible. Increasing costs of energy production, for example due to shrinking of energy sources and awareness to environmental issues in this field has forced humanity to search for alternative, more sustainable ways to produce and consume energy. Therefore energy efficiency is one of the main goals of contemporary research and development both in academy and industry. There are several ways to reduce energy usage, costs and depletion of energy sources. For example, research in the field of renewable energy, which is one of the most prevalent areas of research nowadays, is very important. However, as the implementation of renewable energy techniques is still relatively new and in many cases not cost effective, concurrently other methods to save energy should be invented and improved.

One very large consumer of energy is direct current electric motors, which are found in products ranging from watches to automobiles. Many factors may impact the performance of electric motors during immediate use or in the long run. For example, in the electric car industry, the battery discharge rate is influenced by car load, road quality, age of a battery etc. Developing methods that will facilitate saving energy is of high importance. It will immediately reduce expenses to the end user, and will also extend the lifetime of a battery.

An example of an application where energy consumption is of great importance is the world of logistics, wherein there is a never ending challenge to improve efficiency and reduce the cost of the processes. In the early 1980s automation based solutions began to be implemented in the logistics arena. Since automatic warehouse solutions have been introduced to the industry, they have dramatically reduced operational costs and improved productivity. Generally, in most of the automated warehouses, more than one robot is involved in the logistic process and high efficiency algorithms are employed to deal with division of the tasks between the available robots; however even though the robots are large consumers of energy, historically their energy consumption hasn't been taken seriously into consideration in devising the algorithms responsible for the division of the work load. Many robotic systems use large numbers of robotic units. In order to increase flexibility and maneuverability the status of these robots are constantly shifting between stationary and moving; therefore the way in which their batteries are used becomes critical to efficiency.

An automated warehouse is described in International Patent Application WO 2016/009423 to the inventor of the present invention. This patent application describes an automated warehouse comprising multiple multidirectional autonomous robots that are deployed by a central computer and a picking station. The robots navigate along the isles of the warehouse along the ground and up and across the shelves to pick or put packages at exact designated locations in the warehouse shelving system.

A purpose of present invention is to provide an improved method of warehouse operation that predicts energy consumption of an electric motor that is based on predefined parameters of the motor itself and task specific parameters, according to the application where said motor is deployed.

Further purposes and advantages of this invention will appear as the description proceeds.

SUMMARY OF THE INVENTION

In a first aspect the invention is a method for assigning tasks in an automatic system for picking and placing boxes on shelves in a warehouse. The system comprises:
  a) a set of autonomous mobile robots, each robot comprising electric motors for driving and steering the drive wheels and for operating the gripper mechanism that picks and places the boxes;
  b) a network of vertical and horizontal rails that function as vertical and horizontal supports of the shelves of or are attached to existing supports of the shelves of the shelving system in the warehouse; and
  c) a Real Time Traffic Management (RTTM) server, which is a central processing server configured to communicate with the robots and other processors and servers in the warehouse;

The method comprises:
  i) providing all electric motors on the robots and other components of the warehouse system with sensors for measuring and recording energy consumption of the motor; and
  ii) providing the RTTM with a task assignment algorithm that is configured to calculate all possible scenarios of the system all of the time in order to assign tasks to the robots in a manner that will maximize the global efficiency of the fleet of robots at any given time.

In embodiments of the method the RTTM comprises:
  a) a task data interpretation algorithm configured to determine the priorities of transactions contained in transaction messages received by the RTTM and to parse the orders into individual boxes containing the various items needed to fill each order;
  b) a geographic map database comprising information relating to the physical layout of the warehouse including the locations of each of the robots;
  c) a power consumption database comprising information relating to the power consumption of each of the electric motors in the system or a combination of a few motors that work together to perform a specific job;
  d) a time volatility database comprising information on periodic, calendar based events;
  e) a current power state database comprising information of the current battery state of the battery/batteries on board each robot in the system; and
  f) the current state of the charging batteries in charging/swapping stations.

In these embodiments the contents in each of these databases is constantly being updated when new transaction messages are received and to provide up to date information on the current power state and locations and status of each of the robots in the system.

In embodiments of the method input to the task data interpretation algorithm comprises:
  a) the minimum distance route required for each of the robots in the system to accomplish a task, the minimum distance route calculated by a route calculation algorithm using input from the location of individual boxes containing the various items needed to fill each order supplied by the task data interpretation algorithm and information in the geographic map database;
b) the minimum power route required for each of the robots in the system to accomplish a task, the minimum power route calculated by a power consumption algorithm using input from the distances calculated by the route calculation algorithm and by data from the power consumption database;
c) the location in a volatility schedule calculated by a volatility calculation algorithm using input from the task data interpretation algorithm and the time volatility database;
d) a preferred robot for the task determined by a current state calculation algorithm using input from the task data interpretation algorithm and the current power state database; and
e) the task priority determined by the task data interpretation algorithm; In these embodiments each of the inputs is constantly being updated when the contents of the databases changes and the input to the task assignment algorithm may additionally comprise offline tools analysis data.

In a second aspect the invention is a method of finding the most energetically efficient route for passenger and commercial vehicles comprising battery powered propulsion systems that include electric motors and on-board computers. The method comprises:
a) providing the on-board computer with a Location Based System (LBS) based applications configured to calculate and plan alternative routes to a destination provided by the user;
b) providing the on-board computer access to a database of route information and an algorithm configured to parse each of the routes into segments comprising road quality and elevation for each segment of each of the routes;
c) providing the on-board computer access to a database of vehicle mechanical/technical condition information based on tire pressure sensor, current energy consumption compared to normal and other methods;
d) providing the on-board computer access to a database of route information and an algorithm configured to parse each of the routes into segments comprising road quality and elevation for each segment of each of the routes;
e) providing the on-board computer with a database containing information concerning the energy requirements of the motors for powering the vehicle over segments of roadway having different quality and elevation;
f) providing the on-board computer with up to date information on the status of the batteries, mechanical condition of the vehicle, and vehicle load;
g) providing the on-board computer with an algorithm configured to integrate all information provided to it in a) to c) to determine the energy requirements for each of the alternative routes.

All the above and other characteristics and advantages of the invention will be further understood through the following illustrative and non-limitative description of embodiments thereof, with reference to the appended drawings.

BRIEF DESCRIPTION OF THE DRAWINGS

FIGS. 5A to 5G symbolically show different stages in the process of the robot of FIGS. 3A to 3D leaving the floor of the warehouse and climbing the vertical rail of FIG. 4;

FIGS. 6A and 6B schematically show the means by which the robot of FIGS. 3A to 3D is mechanically locked to the rails of FIG. 4;

DETAILED DESCRIPTION OF EMBODIMENTS OF THE INVENTION

The invention is a method for predicting the energy consumption of electric motors and using these predictions as one of the factors in planning tasks that are carried out with the assistance of the motors.

The method of the invention can be used in any application in which electric motors are employed. In order to illustrate the invention, its implementation in an automated warehouse, specifically a warehouse as described in WO 2016/009423, in which multiple computer controlled robots, each of which comprises several electric motors, are operated, will be presented in detail and implementation for an electric or hybrid car will be briefly discussed.

Figure 1:
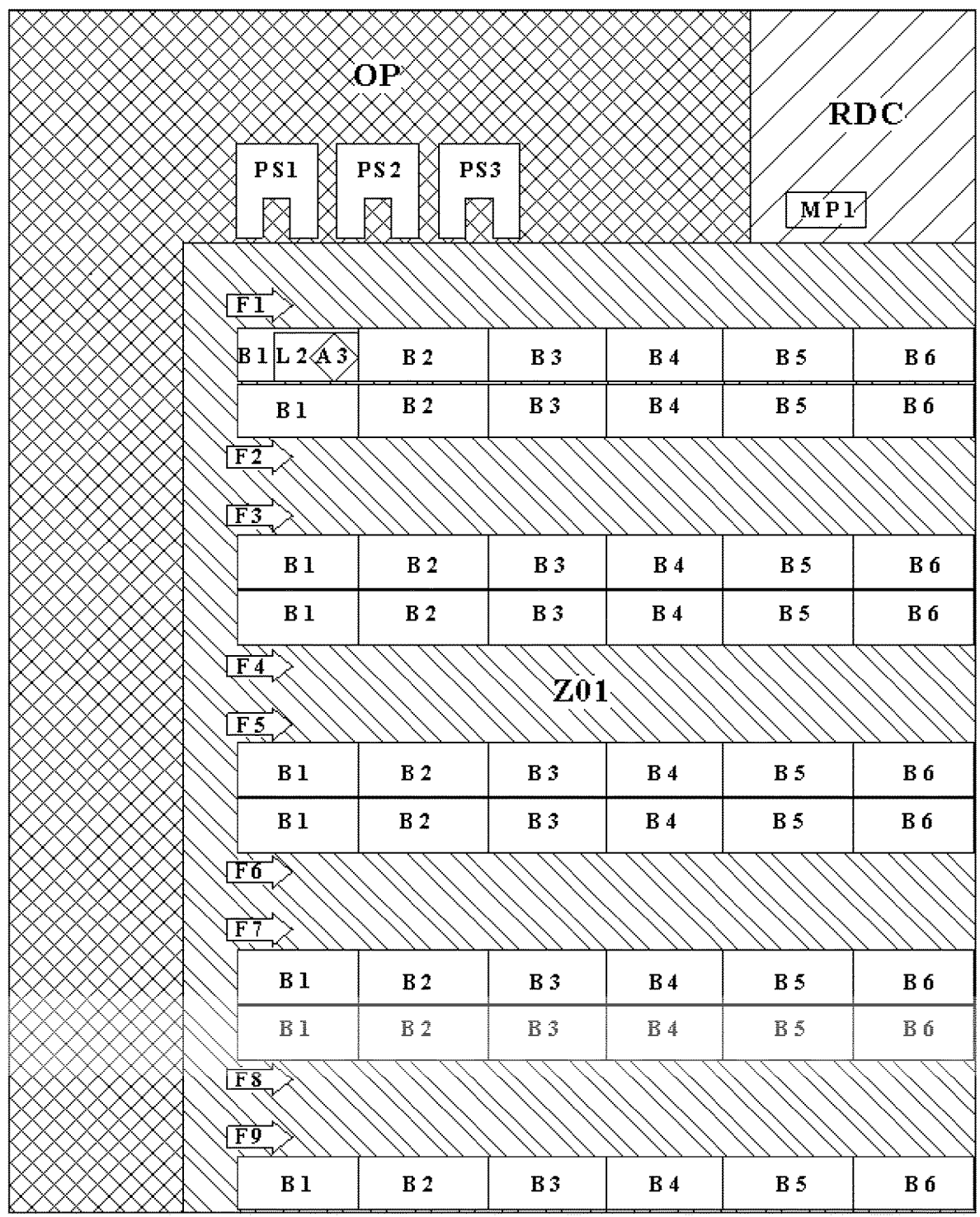
FIG. 1 schematically shows the floor plan of a typical warehouse.

FIG. 1 schematically shows the floor plan of a typical warehouse, which has been automated by addition of the system described in WO 2016/009423. The storage area comprises a plurality of shelving units consisting of a framework commonly made up of horizontal and vertical pieces of angle iron that support the shelves. The vertical supports divide the shelving unit into sections called bays (B1, B2, . . . ). The sides of the shelving units that face the aisles between units are called faces (F1, F2, . . . ). A given row of shelves in a bay is designated by a level number. In order to be able to provide a precise location for a specific box in the storage area, the bays are divided into areas that represent the number of stacks in the bay. Thus the exact location of a box in the warehouse is designated by an address comprising numbers, letters, signs, color, etc. representing the zone, face, bay, level, and stock number. The location of a specific box in the storage area can be designated in other ways, for example using x,y,z coordinates in a coordinate system of the shelf system of the invention or an indoor positioning system.

Boxes or single items (sometimes called caches) within the warehouse are each identified by a Stock Keeping Unit (SKU), which is an identification number that represents the product and attributes of the product and attributes of the box. The attributes of the box relative to this invention are the weight, length, width and height of the box. The SKU distinguishes that box from: a) different size boxes containing the same product having the same attributes; b) the same size box containing the same product with different attributes; c) the same size box containing a different product; etc. In the case of all of these examples the boxes will have different SKUs. During the process of picking product from the boxes, if all of the contents of the box are not used, then the SKU of the box is changed to reflect at least the changed weight of the box before it is returned to the shelving system. Naturally, robots that carry boxes having different SKU's will consume different amounts of energy.

The warehouse comprises two servers: (1) A Warehouse Management System (WMS) server that communicates with the outside of the warehouse, i.e. with customers and suppliers, and sends instructions to and receives information from the second server. (2) A Real Time Traffic Management (RTTM) server configured to communicate with the robots and picking stations. Software in the RTTM server contains a map of the warehouse including the shelving system, generates tasks, prioritization, traffic control, and energy management instructions, which the server sends to the individual robots.

Real time communication between all robots, picking stations and servers is handled over industrial grade routers using secured wireless protocol, e.g. IoT protocols.

Figure 2:
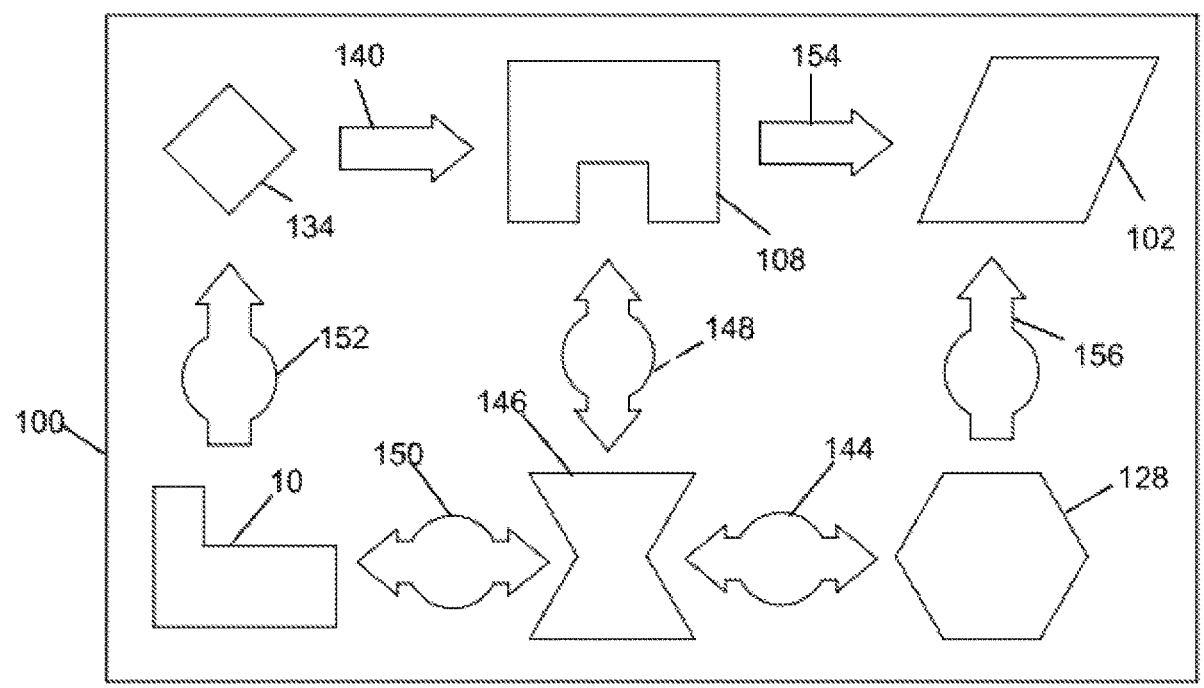
FIG. 2 is a flow chart that symbolically shows the main steps in filling a customer's order that are carried out inside an automated warehouse.
Figure 3A:
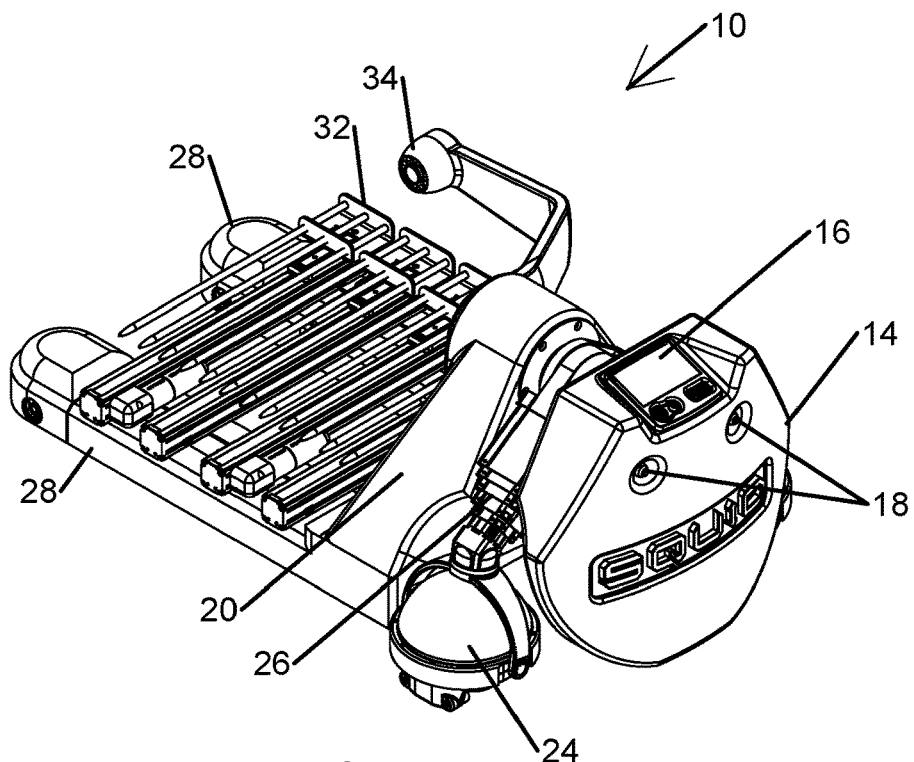
FIGS. 3A to 3D are schematic top perspective, bottom perspective, side, and top views respectively of a robot used to pick and place boxes in an automated warehouse.
Figure 3B:
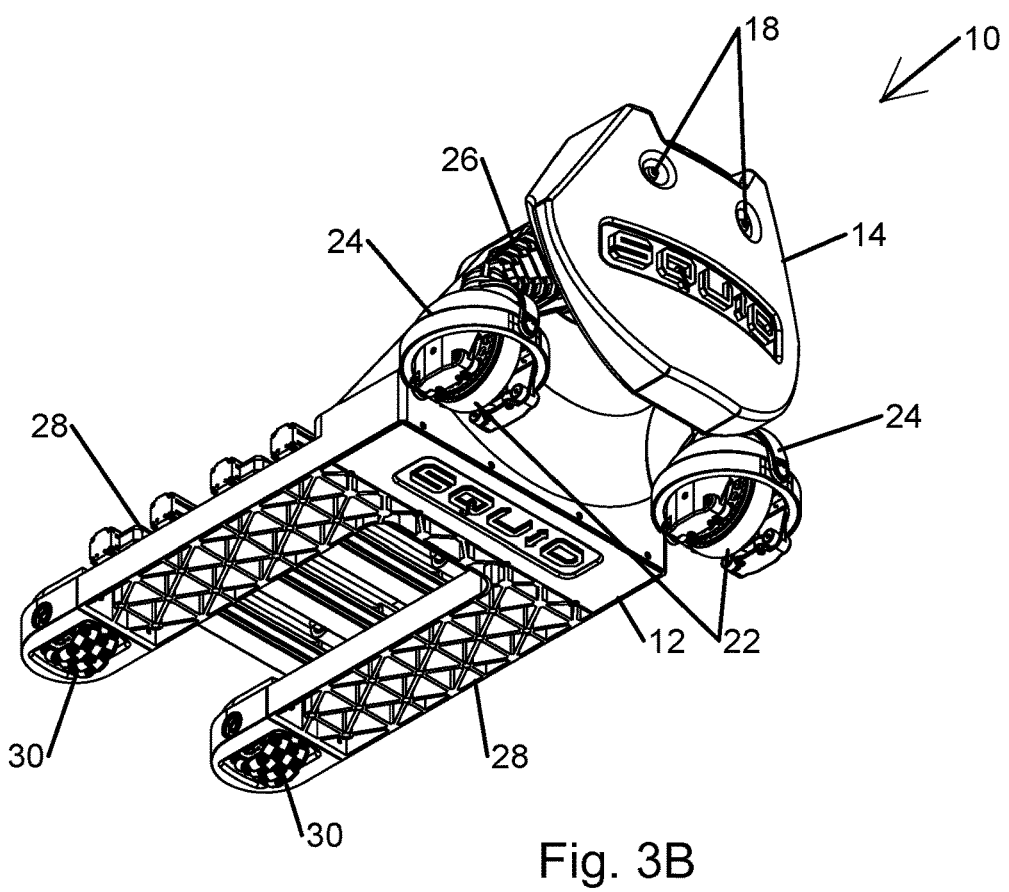
Figure 3C:
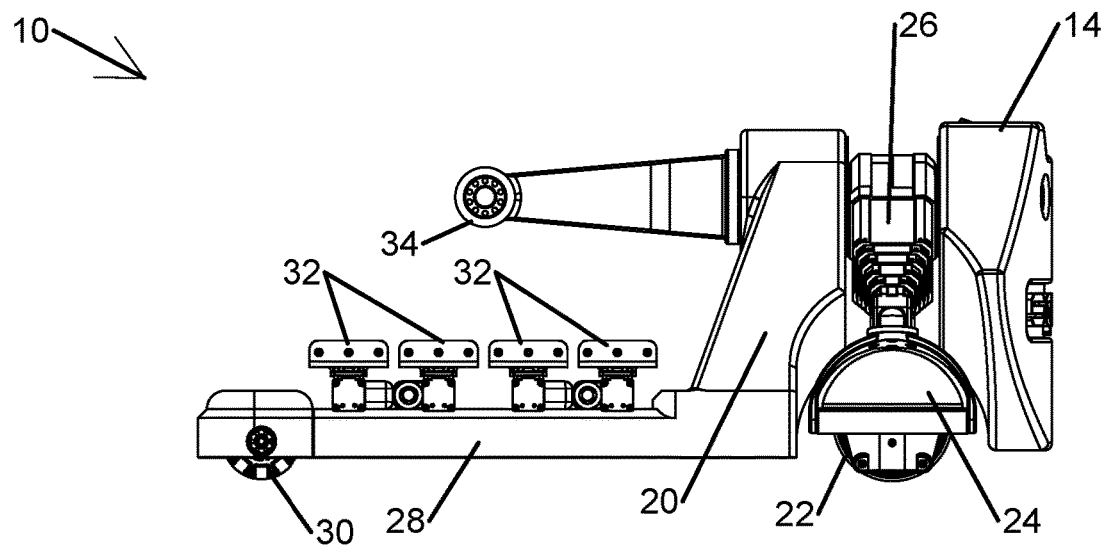
Figure 3D:
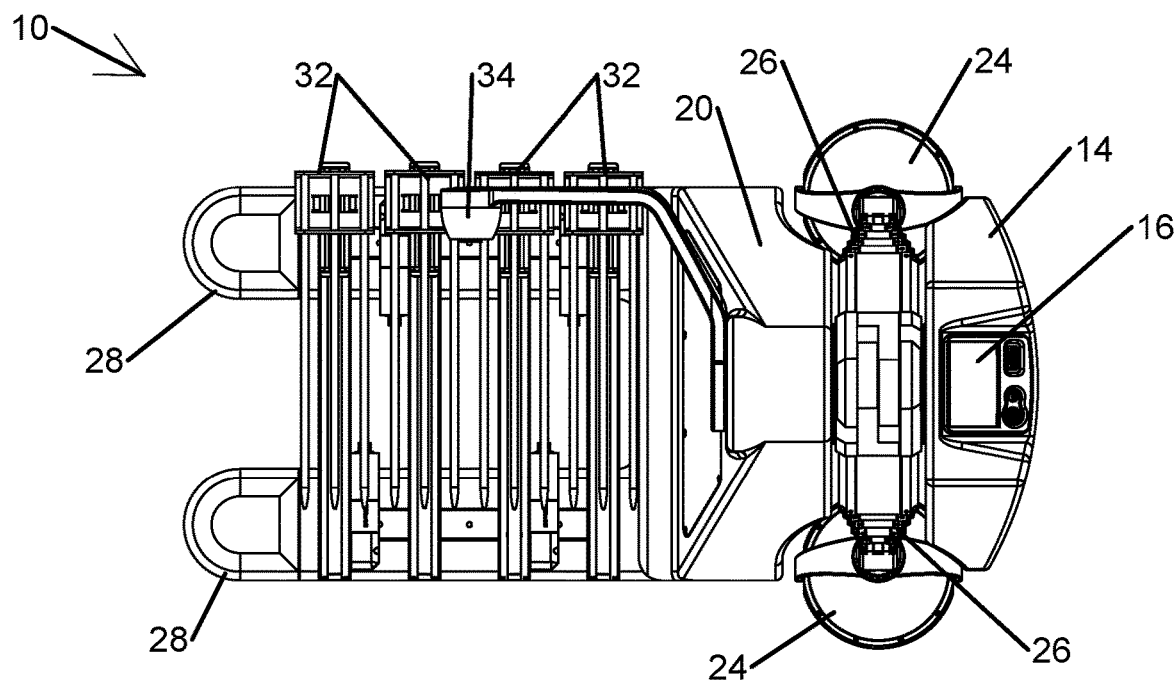

FIG. 2 is a flow chart that symbolically shows the main steps in picking and put-away carried out inside the warehouse. When an order is received by WMS 128 it generates a message by communication link 144 with order details like item number, quantity, SKU, address in storage, priority and other information to RTTM 146. RTTM 146 analyzes the most effective path 152 and determines the most suitable robot to execute the task. A task message is sent via wireless communication links 150 to the robot 10 and a status message via communication link 148 to the picking station 108 containing order details to be verified when items arrive. Robot 10 periodically reports its progress and status to RTTM 146 via communication link 150. RTTM 146 may change the task assigned to robot 10 when a higher priority task is received from WMS 128. For example, the software in robot 10 calculates its path 152 to address 134 and robot 10 self-navigates to address 134. After picking the item 140 at address 134 the robot navigates to picking station 108 and unloads. In some cases where the order requires only some of the items in the box—the robot will get the same or a new address relayed to it from RTTM 146 via communication links 150 and 144 and will navigate to put away the box. After a required amount of items are removed by a worker at the picking station, the software directs the worker by light indexing or other methods known in the art to consolidate the orders and move the completed orders 154 for shipping through RDC 102. A verification note is then sent from picking station 108 to RTTM 146 via communication link 148. RTTM 146 sends a confirmation message via communication link 144 to WMS 128. A delivery note 156 is generated to RDC 102 where it is printed and attached to the shipment box. Wireless communication links 144, 148, and 150 are two way links allowing, for example: the robots to report any obstacles they encounter or technical failures to the RTTM 146; the picking station 108 to query RTTM 146 if an unexpected delay occurs in delivery of an item; or RTTM 146 to report to WMS 128 that the robots are carrying out their missions successfully or if any problems have been encountered.

The autonomous centrally controlled mobile robots of the system have 3 dimensional movement capabilities enabling them to travel along the ground and up and along the shelves. The robots are designed to bring desired boxes to and from the picking station. Utilizing at least one pair of motorized arms, the robots navigate both along the ground and up and along the shelves to the exact desired location. The robots are pre-loaded with proprietary software which includes the warehouse layout, routes, intersections, and designated areas.

FIGS. 3A to 3D are schematic top perspective, bottom perspective, side, and top views respectively of the robot 10 of the system of the invention. The main components of robot 10 which are shown in these figures are mounted on a frame comprised of two long beams 28 that are rigidly connected together at one end by a shorter beam 12. On top of the frame sits an array of micro-pallet lifters 32 which are used to place boxes on the shelves of the warehouse and to remove them from the shelves. The micro-pallet lifters serve to lift the boxes and as a platform on which boxes are transported to and from the shelves by the robot. Also seen in the figures is a fine positioning sensor 34 used to aid in removing and replacing boxes from the shelves. On top of beam 12 is located a battery case 20 that houses the batteries that power the robot. At the front of the robot is a command module 14 that houses the processor, software, and other electronics that guide the robot and enable it to carry out its assigned tasks. Visible in the figures on the outside surface of command module 14 are a user interface 16 and two ports 18 for charging the batteries. Not shown in the figure are a set of on-board sensors that are located at various locations on the robot to aid the robot in navigation and to identify obstacles. The sensors are of various types, e.g. optical, Radio Frequency Identification (RFID), magnetic and indoor triangulation system that form a virtual "bubble" around the robot as it travels. Those sensors also serve the safety module which allows the robot to be safe enough to operate in a human environment and interact with workers.

Robot 10 moves along the ground on four wheels. The two rear wheels 30 could be fixed and passive so that they can only rotate about their axles which are perpendicular to the axis of the long beams 28 of the frame and are "dragged along" by the front wheels. In another embodiment the rear wheels could be multi directional wheels which allow movement to any direction, about an axis vertical to the floor. In this later embodiment the front driving wheels 22 dictate the steering angle and differential speeds of the rear wheels. The two front wheels 22 can be independently rotated in any direction by electric motors in drive and steering units 24. With this arrangement the robot is completely autonomous and can be steered by its control system to any location on the floor of the warehouse without the use of a track, embedded wire or any other arrangement to guide it. Drive motor controllers #1 and #2 are each connected to one of the front wheels of a robot. These controllers are responsible, in addition to activating the electric motors in the drive and steering units, for measuring and recording in an onboard database the energy consumed by the right and the left front wheels of the robot respectively. The drive and steering units 24 are attached to the robot by means of arm units 26. Each arm unit 26 comprises three or four electric motors that, by means of mechanical linkages and gears, cause the arm to expand, contract, and have other degrees of freedom that allow the robot to raise itself off the floor and to move up and along the shelves in order to place or pick cartons from the shelves.

Each drive and steering assembly 24 comprises a hemispherical shell 38 which houses wheel 22 and two electric motors and gear assemblies (not shown). One of the motor and gear assemblies (the steering motor) rotates the drive wheel 22 up to 360 degrees around a vertical axis (when the robot is on the floor) to steer the robot. The second motor and gear assembly (the drive motor) is configured to rotate the wheel 22 in both clockwise and counterclockwise directions around a horizontal axis (when the robot is on the floor) thereby causing the robot to move in the direction that the wheel has been pointed. At least the drive motor is a variable speed motor, which allows the robot to travel at different speeds. When travelling on the ground it is also possible to steer the robot by activating the drive motors to produce differential rotational speeds of the two front drive wheels.

The system described in WO 2016/009423 is designed to be integrated with the shelving system and infrastructure resources of an existing conventional warehouse. The rails are designed to be easily attached to the existing shelving in the warehouse by conventional means such as bolts, fasteners or quick-lock mounts. Although a main idea is to retrofit existing warehouses, the system can obviously be installed in new structures, in which case the rails of the invention can be manufactured as an integral feature of the shelving system. In an embodiment of the system the rails are not attached to the shelving but are constructed as free standing structures that stand next to the shelving.

Figure 4:
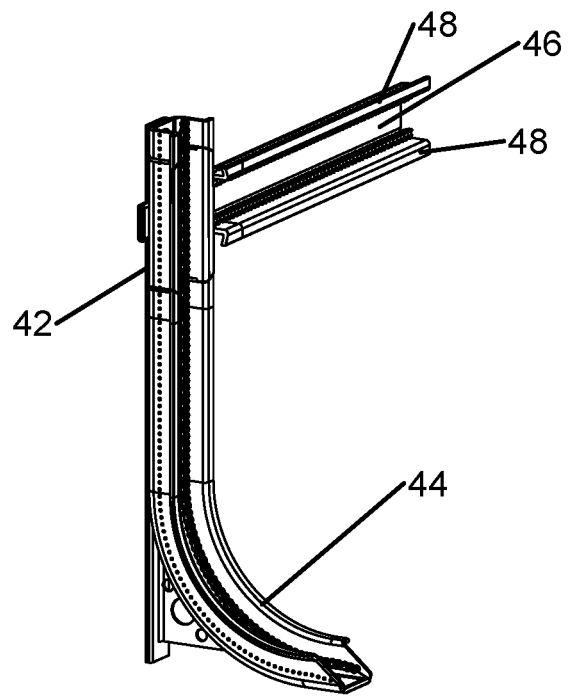
FIG. 4 schematically shows the rails upon which the robot of FIGS. 3A to 3D can move up and along the shelves in an automated warehouse.

FIG. 4 schematically shows the rails of the system of the invention. The vertical and horizontal rails 42 have identical geometry. They are made from "U"-shaped profiles—that could be made from different types of materials or with different thickness depending on the strength required—with a channel 46 in which the front wheels 22 of robot 10 travel and two flanges 48 on either side of channel 46. A curved piece of rail called a terminal 44 is attached to the bottoms of the vertical rails where they reach the ground. This is the only place where robots 10 can connect or disconnect from the rails 42 in order to climb to or descend from the shelves.

The robots are able to move on the rails vertically and horizontally along the shelves. The robots engage the rails only at a designated "terminal" located on the floor at the bottom of a vertical rail which they can climb. The specially designed junctions between vertical and horizontal rails allow the robots to automatically change direction from vertical to horizontal and vice versa. The shape of the profile of the rails and the design of the robot's drive wheels prevent the robots from disengaging from the rails during those maneuvers. The rails can also be configured to enable the robot to cross from one side of an aisle to the other without the need to go down to the floor.

FIGS. 5A to 5G symbolically show different stages in the process of the robot of the system of the invention leaving the floor of the warehouse and climbing a vertical rail attached to the shelving. In order to complete its mission of removing a box from (or delivering a box to) a specific location on a shelf the robot travels vertically with both front wheels in the same vertical rail and travels horizontally with one of its front wheels in a horizontal rail that is attached to the shelf on which the box is located and the other front wheel in a horizontal rail that is attached to the shelf above the first shelf.

Figure 5A:
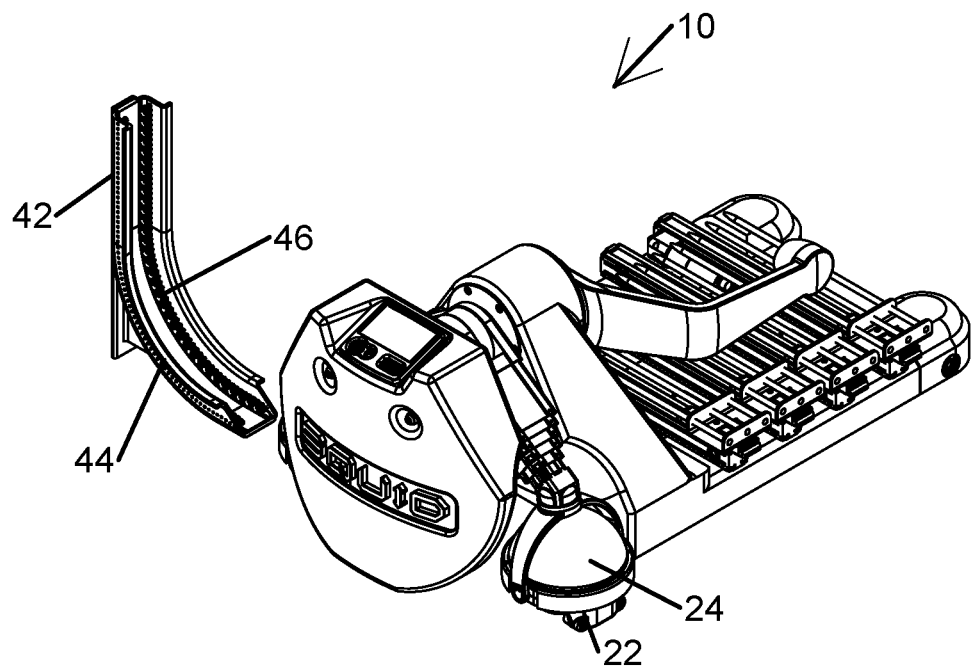

In FIG. 5A the robot 10 has used the set of on-board sensors to travel using anchor point navigation to the designated vertical rail 42 that it has been instructed to ascend to reach one of the shelves in the warehouse. A sensor, e.g. a RFID sensor, which is activated as robot 10 approaches the designated terminal 44, stops the robot at an exact position relative to terminal 44. The electric steering motors in the drive and steering units 24 are activated to turn both front wheels 22 by ninety degrees so that they are exactly facing the "U"-shaped channel 46 in terminal 44.

Figure 5B:
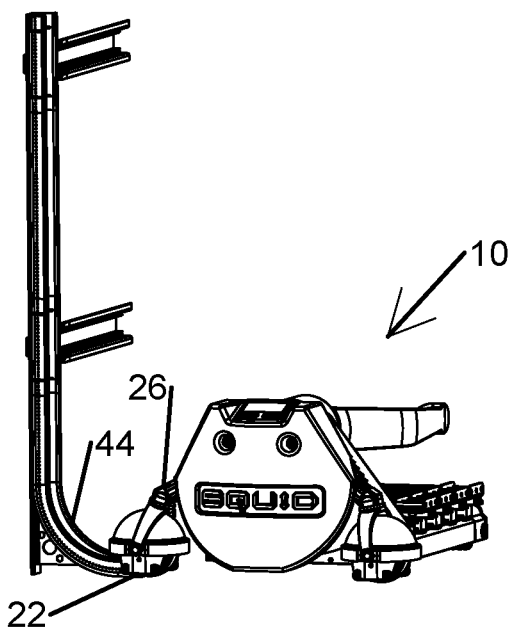

In FIG. 5B a synchronized movement takes place between the driving motor of the right front wheel 22, and electric motors and actuators (not shown in the figures) inside the right arm unit 26 that are responsible for changing the length and angle of the arm unit advancing the right wheel into the "U"-shaped channel 46 in terminal 44 while the robot 10 remains in position on the floor. As right wheel 22 enters the terminal it is mechanically locked to the rail as will be described in relation to FIGS. 9A and 9B herein below.

Figure 5C:
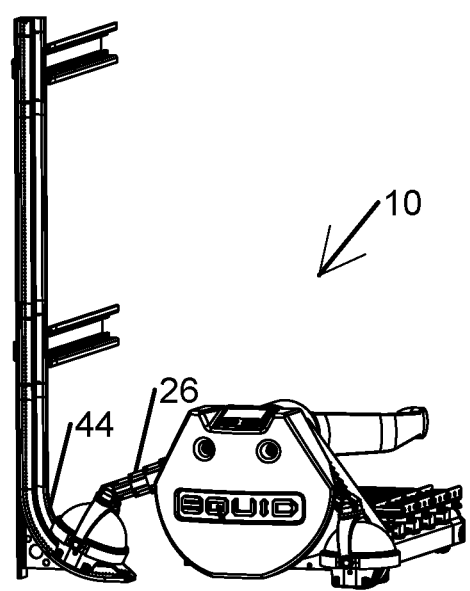

In FIG. 5C the synchronized movement between the driving motor of the right front wheel 22 and right arm unit 26 continues to extend the right arm unit as right wheel 22 moves further up terminal 44.

Figure 5D:
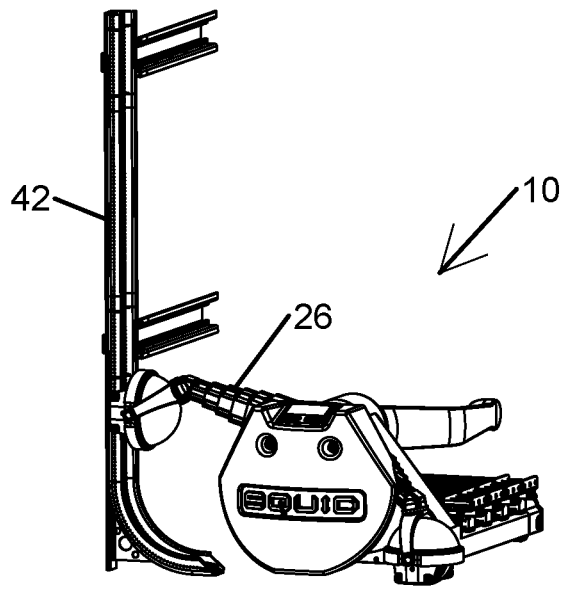
Figure 5E:
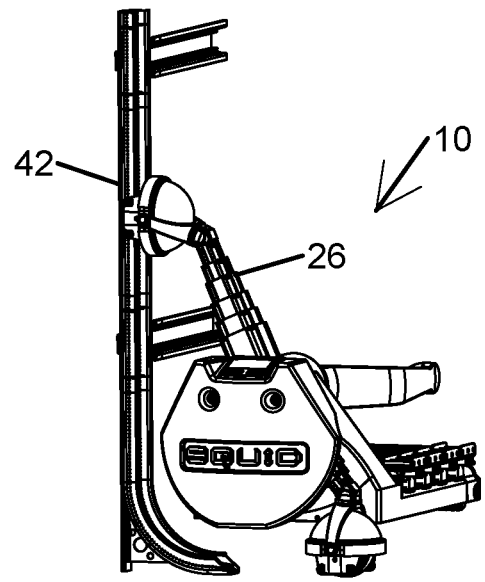

In FIG. 5D right arm unit 26 extends further and swings upwards while right wheel 22 moves out of the terminal 44;

In FIG. 5E the right wheel has advanced further up vertical rail 42 and starts to pull the robot 10 slightly off the ground. At the same time the left arm unit 26 is activated to cause the left front wheel to push against the ground pushing the body of the robot closer to terminal 44.

In FIG. 5F left front wheel 22 moves into the "U"-shaped channel 46 in terminal 44 and is locked to the rail.

In FIG. 5G both front wheels are travelling upwards in the "U"-shaped channel 46 in vertical rail 42.

FIG. 6A schematically shows a bottom view of an embodiment of the shell 38 of drive and steering unit 24. The wheel 22 and all other components of the drive and steering unit have been removed to show the small wheels 36 that lock the robot to the rails. As can be seen on each side of the shell 38 there is a group of five small wheels 36. Each group comprises two wheels mounted with their axles parallel to the sides of the shell and three wheels mounted with the axels perpendicular to the sides of the shell. FIG. 6B schematically shows how, when the drive wheel 22 enters the U shaped channel 46 in rail 42 the small wheels 36 lock the drive wheel on the rail. The two wheels mounted with their axles parallel to the sides of the shell roll along the rail pressing against opposite sides of the outside of the channel 46 to prevent twisting and two of the other wheels roll along the rail pressing on flange 48 from above and the third wheel roll along the rail pressing on flange 48 from below to prevent the robot from falling off the rail.

Figure 7:
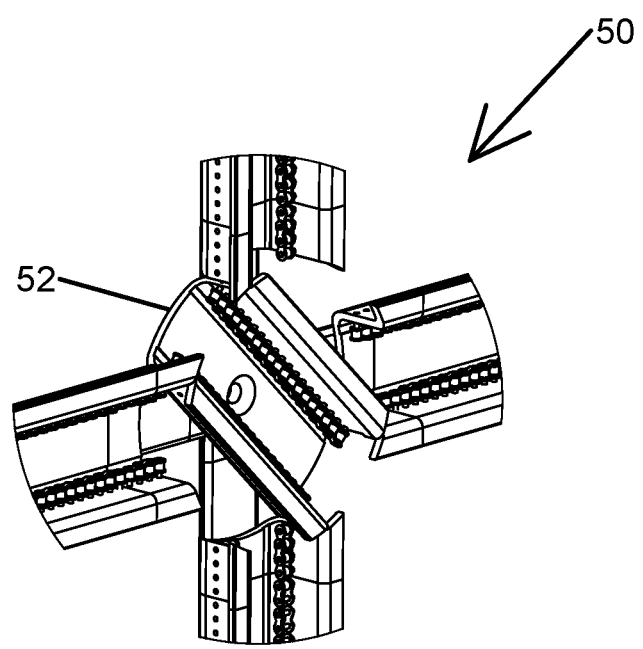
FIG. 7 schematically shows a junction between vertical and horizontal rails of FIG. 4.

FIG. 7 schematically shows a junction 50 between vertical and horizontal rails. Junction 50 is comprised of an open circular area centered at the intersection between the vertical and horizontal rails. A section of rail, known herein as a bridge 52, pivots about the center of this circular area to alternately connect the two sections of the vertical rail or the two sections of the horizontal rail. Bridge 52 has the same profile as the rail so the robot is consistently locked to the rails as described before. The direction of bridge 52 is changed either by the drive and steering unit in case the robot is on the bridge or a special push rod located at the junction, which the rollers 36 push against when the robot gets close to the junction.

In order to place the cartons on the shelves or to pick them up, the robots are equipped with a gripper mechanism; in principle the gripper mechanism can be any of the different types known in the art. In an embodiment the robots are equipped with mechanisms, known herein as micro-pallet lifters, which comprise sets of tines and operate in a manner similar to a fork lift. Each micro-pallet lifter can be operated independently of the others. In addition, the micro-pallet lifters and also the fine positioning sensor can be turned by 180 degrees allowing a robot to access both sides of an aisle. In another embodiment the gripper mechanism is a robotic arm, also powered by electric motors.

In WO 2016/009423 the algorithm/s in the RTTM uses known parameters of the warehouse and of each robot involved in warehouse logistics processes to calculate the optimal route for each robot and to determine which robot should be assigned to carry out a specific task. According to this method, when a new task is received, the following information is processed by the system for each robot: current location in the warehouse, distance from the current location to the location on the shelves of the box and from the shelf to the picking station, status of the robot (is it in the middle of performing a task or available for a new task), battery status and weight and size of the box to be moved (if the robots have different carrying capacities, this parameter is important in order to know if the robot is capable of performing the task). Each of the above mentioned parameters is considered separately and contributes to a score for each robot that is calculated by software in the RTTM 146. The task is then assigned to the robot having the highest score.

The method of the present invention for assigning robots to tasks in the warehouse differs from and improves upon that of the prior art system by adding a prediction of the time and energy consumption and the cost required for a specific assignment to the algorithm that assigns a robot to a specific task. The method of the present invention is also used to determine the policy of service and preventive maintenance procedures as it allows a value (or score) for each individual component within the robot.

The ultimate goal of the method is to create an algorithm, which will take into considerations all of the energy consuming components in the warehouse system. The power consumption for each component is sensed separately and a virtual scenario is built in which the behavior of each component is learned. Analyzing the length, speed, linearity and power consumption of each component in the scenario will help predict the energy needed for each component in every operation. Calculating all this in correspondence to the specific environment, i.e. the warehouse layout, and the known weight of a load will enable predictions of power consumption for future scenarios using machine learning to apply more efficient and more effective behavior of the system.

In an initial learning stage, data collection is performed for a pre-defined period of time, in order to build a database of measured power consumption of the electric motors on each robot in the warehouse as a function of distance travelled, load, and age of the component.

For example data concerning power consumption of the motors in the drive wheels is collected by drive motor controllers #1 and #2 and recorded in a Log in the onboard computer of the robot separately since for each direction the robot turns different forces must be applied to each of the front wheels.

Power consumption data for the following six types of travel are collected:
power consumption for each motor as a function of distance and speed when traveling with no load on the ground;
power consumption for each motor as a function of distance and speed when traveling with no load on horizontal segments of the rail system;
power consumption for each motor as a function of distance and speed when traveling with no load on vertical segments of the rail system;
power consumption for each motor as a function of distance, speed, and SKU when traveling carrying boxes of different weights on the ground;
power consumption for each motor as a function of distance, speed, and SKU when traveling carrying boxes of different weights on horizontal segments of the rail system; and
power consumption for each motor as a function of distance, speed, and SKU when traveling carrying boxes of different weights on vertical segments of the rail system.

After a predetermined amount of data is collected, the average values of all power consumption collected from all motors for each type of travel are transferred to a power consumption database in the RTTM 146. From the power consumption database information for each robot can be extracted relating to the average power requirement per meter travelled on the ground, and for travel on each segment of the vertical and the horizontal rails of the shelving system as a function of the load—either zero or as defined by a specific SKU. In embodiments of the invention, after the initial data collection stage, power consumption data is continually collected on the robots and periodically transferred to the power consumption database to update the information stored therein.

In addition to using the information in the power consumption database to determine which robot should be assigned to a specific task, the information can be used to schedule preventive maintenance of the robots and, by comparing present power consumption to historical records, to monitor the condition of the paths on the ground and segments of rail that the a robot is travelling upon, the condition of the batteries, the life cycle of specific components, and other parameters of interest related to the warehouse and the equipment in it.

Figure 8:
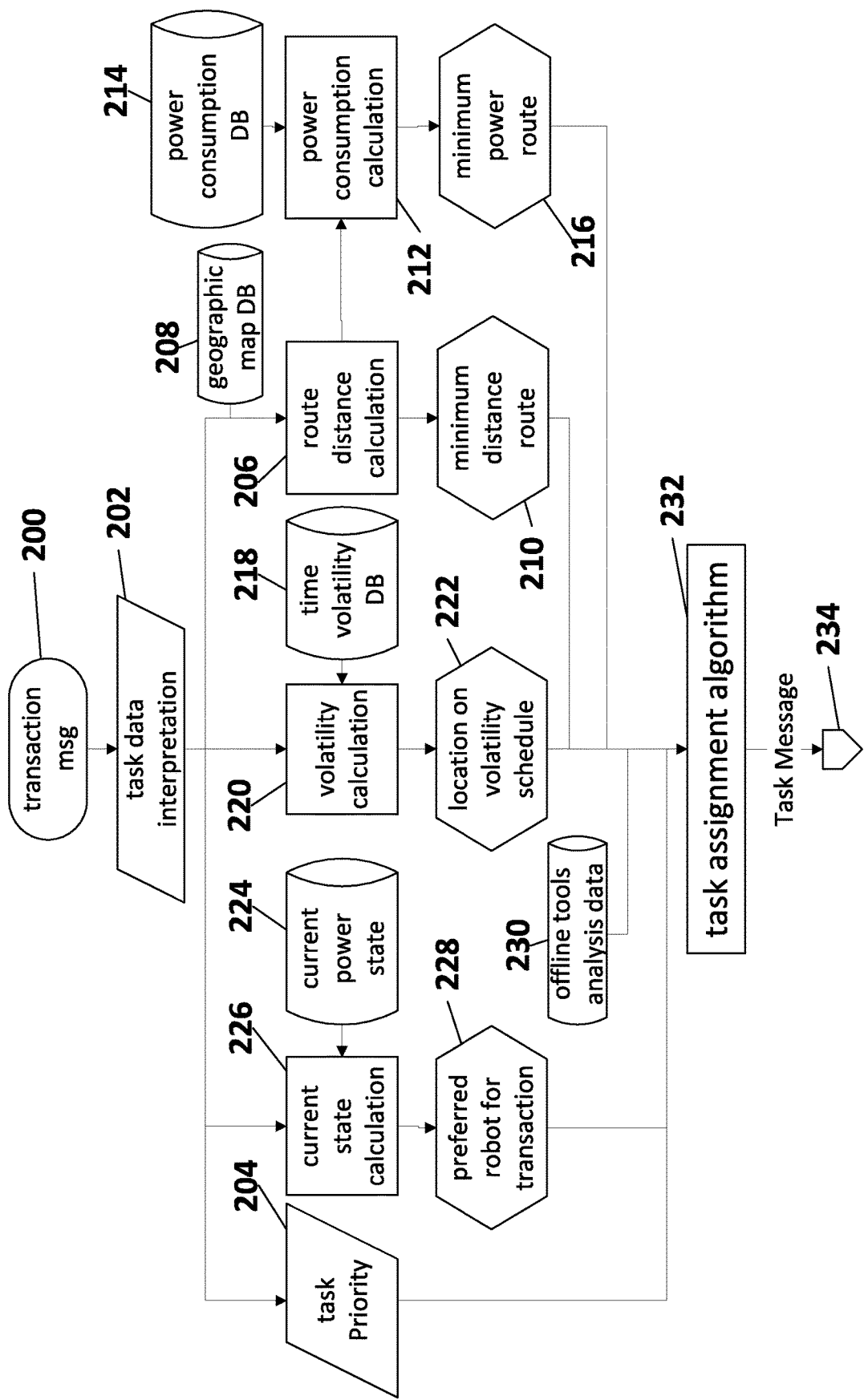
FIG. 8 is a chart that symbolically shows the main inputs to an algorithm that assigns tasks to robots in an automatic warehouse.

FIG. 8 is a chart that symbolically shows the main inputs to an algorithm that assigns tasks to robots in an automatic warehouse by determining which robot is should be assigned to carry out a specific job. The algorithm is configured to calculate all possible scenarios of the system all of the time in order to maximize the global efficiency of the fleet of robots at any given time and not just to determine the efficiency for each individual task. This algorithm exists in the RTTM and its goal is to create the best work plan possible for all known pending jobs considering:
  The warehouse layout
  Available robots with their individual characteristics, i.e.:
    Model (which influences speed, capacity, endurance, etc.)
    Type of arm (for different jobs)
    Serial #
  Battery charging/swapping stations
  Time volatility
  all pending jobs
  Output of the analysis based on all the systems logged data (big data analysis) such as:
    Average or specific robot consumption on a given segment
    Average speed reached on a given segment under similar conditions
    Predicted need for maintenance
  offline tools analysis data, i.e. work that is not a part of the task like cycle counts, inventory validation, specific location survey, etc. This could also be a user defined job The algorithm creates the best work plan according to the following target functions:
  minimum time (maximum throughput for the warehouse)
  minimum power consumption
  minimum maintenance requirements The first input to the algorithm is a transaction message 200 containing a customer's orders, which are sent to data interpretation algorithms 202 located in the RTTM 146. Data interpretation algorithms 202 determine the priorities of the transactions 204, which are sent to task assignment algorithm 230. Data interpretation algorithms 202 also parse the orders into individual boxes containing the various items needed to fill each order and sends the SKUs of the boxes and locations on the shelves in the warehouse for each box to a route distance calculation algorithm 206.

The route distance calculation algorithm 206 draws data from the geographic map database 208 also in the RTTM 146 to calculate the distance from the present location of each robot in the system to the locations of the boxes on the shelves. The distances on the ground are calculated for several alternate routes. The distances on the rails, which is the same for all routes, are also calculated and the minimum distance for each robot is determined 210 and sent to the task assignment algorithm 232.

The distances calculated for all alternative routes parsed into distance on the ground and vertical and horizontal distances on the shelves are sent from the route distance calculation algorithm 206 to a power consumption calculation algorithm 212 in RTTM 146. Power consumption calculation algorithm 212 draws data from the power consumption database 214 (described herein above) for each of the robots and for the SKU of the boxes to calculate the power consumption for each robot for each route. The route for each robot that requires the minimum consumption of power is determined 216 and sent to the task assignment algorithm 232.

The RTTM nominally uses a linear programming model and solver in order to calculate the optimal plan. However, if no suitable plan is found in an allotted time, the RTTM switches to a heuristic algorithm.

As described above, the model breaks down all jobs into many components and assigns a cost function to each sub-component as shown, for example in the following table.

| Job Model Element | Cost Component | | |
|---|---|---|---|
| | Time [seconds] | Power Consumption [WH] | Monetary Cost [$US] |
| Idle time | Waiting time | f(. . .) | f(. . .) |
| Straight Ground segment | f(. . .) | f(. . .) | f(. . .) |
| Ground turn | f(. . .) | f(. . .) | f(. . .) |
| Transition to/from vertical | f(. . .) | f(. . .) | f(. . .) |
| Upward track motion | f(. . .) | f(. . .) | f(. . .) |
| Downward track motion | f(. . .) | f(. . .) | f(. . .) |
| Rack junction rotation | f(. . .) | f(. . .) | f(. . .) |
| Horizontal rack motion | f(. . .) | f(. . .) | f(. . .) |
| Navigation camera | 0 | f(. . .) | f(. . .) |
| Box picking | f(. . .) | f(. . .) | f(. . .) |
| Battery charging/swapping | f(. . .) | f(. . .) | f(. . .) |
| Other job model elements . . . | f(. . .) | f(. . .) | f(. . .) |

For instance, for maximum speed for a single robot, the time cost for moving up a vertical rack segment is given by:

$$\text{Duration}_{\text{Upward Rack Motion}} = f(\text{distance}, \text{robot weight}, \text{package weight}, \text{efficiency of the motors}, \dots)$$

For the maximum speed target, the algorithm will minimize an expression similar to the following:

$$\text{Total Duration} = \sum_{i=1}^{\#of\ resources} \left( \sum_{j=1}^{allocated\ jobs} \left( \sum_{k=1}^{job\ model\ elements} \text{Duration}(p_1, p_2, \dots, p_n)_{i,j,k} \right) \right)$$

Where, $(p_1, p_2, \dots, p_n)$ represents the job element types.

For the minimum Power Consumption target, the algorithm will minimize an expression similar to the following:

$$\text{Total Consumption} = \sum_{i=1}^{\#of\ resources} \left( \sum_{j=1}^{allocated\ jobs} \left( \sum_{k=1}^{job\ model\ elements} \text{Power Consumption}(p_1, p_2, \dots, p_n)_{i,j,k} \right) \right)$$

The cost component is multi-dimensional as it depends on many other parameters including:
- robot model (speed, geometry, gear ratios . . . )
- actual performance of the components (e.g. an old battery or motor may not operate at nominal specification)
- depreciation and maintenance cost of the various components.

For the Monetary Cost target, the algorithm also takes into account all of these factors in addition to the trivial:

$$\text{Cost} = \sum_{i=1}^{\#of\ resources} \left( \sum_{j=1}^{allocated\ jobs} \left( \sum_{k=1}^{job\ model\ elements} \text{Cost}(p_1, p_2, \dots, p_n)_{i,j,k} \right) \right) + \text{Operational Costs}$$

Figure 9:
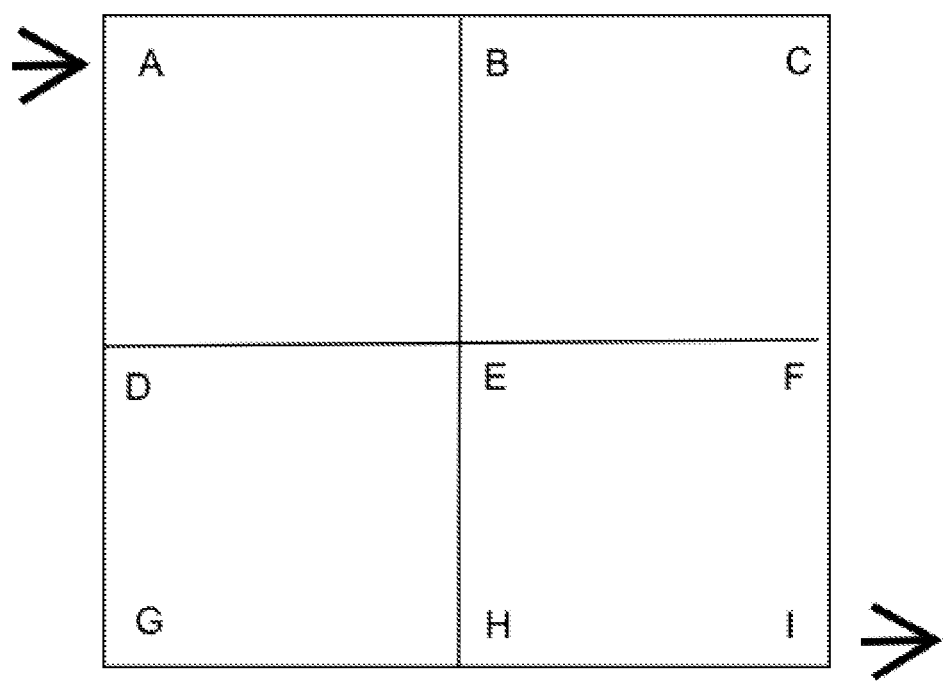
FIG. 9 symbolically demonstrates an extremely simplified example of a very simple power consumption cost calculation.

FIG. 9 symbolically demonstrates an extremely simplified example of a very simple power consumption cost calculation. The problem to be solved, i.e. the target, is to determine the route that will require the minimum energy consumption for a single robot to travel from point A to point I. In this example the dimensions of each of the four cells are 4 meters×4 meters.

The energy cost table for the robot is:

| | |
|---|---|
| Straight Segment | 5WH (acceleration + deceleration) + 5WH/Meter |
| Rotation | 2.5WH/45 degrees or 5WH/90 degrees |

The target will now be determined only for the following evaluated routes:
Route 1: A, B, C, F, I
Route 2: A, E, F, I
Route 3: A, E, H, I The algorithm will break each route into its "billable" components:

(forward 8 m)+(rotation 90 deg)+(forward 8 m)+
    (rotation 90 deg)=(40+5)+5+(40+5)+5=100 WH    Route 1:

(rotation 45)+(forward 5.65 m)+(rotation 45 deg)+
    (forward 4 m)+(rotation 90 deg)+(forward 4

Route 2:
m)+(rotation 90 deg)=2.5+(5+28.25)+2.5+(5+
20)+5+(5+20)+5=98.25 WH

Route 3:
(rotation 45)+(forward 5.65 m)+(rotation 45 deg)+
forward 4 m)+(rotation 90 deg)+(forward 4
m)=2.5+(5+28.25)+2.5+(5+20)+5+(5+20)=93.25
WH In this case, Route 3 requires the lowest cost, i.e. least energy, and will be the one selected by the algorithm.

It is noted that the actual consumption formulas are much more complicated and are given by the integration of the instantaneous consumption dependent on many parameters such as speed, temperature, specific robot efficiency and so on. Also, the actual algorithm will minimize the cost for all the tasks together, even if a single robot may have to take a slightly less than optimal route.

Additional information that is input to task assignment algorithm 232 is provided by the Time volatility database 218 and the current power state database 224 and task priority information 204 and offline tools information 230 that is input supplied by the system operator, the WMS, or internally from the RTTM.

Time volatility DB 218 in RTTM 146 holds information on periodic, calendar based events. This information may include periods when the work load is extra high or extra low, for example holiday seasons, end of month/end of year orders, beginning of week/month/year and any other parameter that can impact the load of the warehouse. The time volatility DB 146 can also be updated when a large order/delivery arrives or is expected.

DATA stored in the Time volatility DB 522 is sent to a volatility calculation algorithm 220, which assignees it to a location in a volatility schedule 222 which is transferred to task assignment algorithm 232.

The following table illustrates a typical table stored in time volatility DB 218. The table shows the number of jobs scheduled for the coming week for each of the three shifts in a warehouse.

| Shift | Mon | Tue | Wed | Thu | Fri |
|---|---|---|---|---|---|
| Morning | 200 | 300 | 200 | 100 | 300 |
| Evening | 250 | 400 | 300 | 200 | 600 |
| Night | 50 | 100 | 100 | 100 | 150 |

Using the data in the table the volatility algorithm can detect that the rate of tasks increases towards the evening shifts and that Tuesday and Friday are busier than the other days. This information will be passed to the WMS 128, which will command a schedule of battery swap/recharge before the evening shifts start and will direct the most charged robots to picking jobs on Tuesdays and Fridays. In addition data from the time volatility schedule 222 is used in determining the criterion by which the task algorithm 232 determines how the robots are selected and operated. For example, during very busy shifts the time available in which all tasks must be completed might be severely limited; therefore the task algorithm 232 may instruct the robots to travel at higher speeds, which require expenditure of more power and therefor are more expensive to operate. On the other hand if there are fewer tasks to accomplish the robots may be instructed to work at slower more energy efficient, lower cost speeds.

Information of the current battery state, i.e. charge status and age, of the battery/batteries on board each robot is stored in a current power state database 224 in RTTM 146. The current power state database 224 is continuously or frequently updated by the onboard computers of the individual robots in the warehouse. A current state algorithm 226 draws data from the current power state database 224 and compares the current power states of all of the robots to determine which of the available robots, i.e. which of the robots that isn't presently engaged in performing another task, at a battery charging station, or undergoing maintenance, is most suitable to carry out the task based on the available power in its batteries. The identity of the preferred robot for carrying out the transaction 228 is sent to the task assignment algorithm 230.

Offline tools analysis data 239 includes the result of analysis performed by the system on data logged during operations that allow the system to learn and improve itself. Such analysis output includes, for instance, specific motor consumption to achieve a given speed on an horizontal or vertical segment, speed achieved by robot on a given section or the predicted need for maintenance due to passed failure pattern identified by the system.

Offline tools analysis data 239 includes, for example periodic/proactive cycle counts where the robot scans a specific segment (could be locations, levels, buildings or even the whole picking face) of the warehouse. Another example is inventory validation where the robot's original route can be slightly changed to verify the presence of specific inventory item.

The task assignment algorithm 232 is a complex algorithm that works in real time to uses all of the information shown in FIG. 8, i.e. 204, 210, 216, 222, 228 and 230 as input to decide which robot should perform each of the tasks and to send a task message 234 to the selected robot. The task message typically contains the location on the shelving system of the target box and its SKU and route information from the current location of the robot to the target box and to the destination to which it is to be delivered.

Task assignment algorithm 232 is designed to take an overall view of the entire system with its main objective to operate the system with maximum efficiency and minimum cost. The algorithm must be constantly on the alert to changes in the inputs, which are constantly updated as new transaction messages 300 and information on the current power state 324 and locations and status of each of the robots is received. Task assignment algorithm 232 is configured to make real time changes to assignments as conditions changes, for example to cancel a task assigned to a robot, to assign it a new task while on its way to carry out the original task, and to assign the original task to a different robot. In another example task assignment algorithm 232 may select a longer route for a robot to pick a box if the minimum route is congested by other robots travelling on a part of the minimum distance route for the robot.

In addition to pick and place related assignments, information collected in determining the task assignments can be put to other uses within the warehouse. For example, the power required for the path route from the robot's current location to the nearest charging station can be calculated by algorithm 212 and the robot sent to the charging station only when available power approaches the amount required, thereby reducing the "down time" of the robot when compared to the conventional method of recharging the batteries automatically when their available power is reduced to a fixed level, e.g. 25%, or after a fixed operating time.

In another application of the present invention the method is adapted to find the most energetically efficient route for passenger and commercial vehicles comprising battery powered propulsion systems including electric motors and onboard computers. When prior art systems such as standard Global Positioning Systems (GPS) based applications make calculations and plan routes, normally they base their decisions on the distance from origin to destination provided by the user. Some of these systems (such as Waze) are also able to take into account the traffic status in real time and inform the user of alternative ways to arrive to the destination.

The method of the present invention provides added value and efficiency to existing navigation systems by adding more factors that are relevant for vehicle energy consumption. The following parameters can be considered by the system of the present invention:

Vehicle load—a heavily loaded vehicle requires more resources from the motor than for the same vehicle when unloaded, therefore energy consumption increases with the increase in total weight of the vehicle.

Elevation along the route—requires more energy than when driving along flat terrain.

Road quality—in some cases, if the data about the road quality is available, it can also be considered in the calculation of route efficiency. Travelling on new, straight inter-city highway is more energy economical than travelling on a gravel road in the country side. However, since a value of this parameter is hard to estimate its impact on energy consumption, will have less influence on the overall efficiency score.

Mechanical condition of vehicle—symmetrical mechanics in drive train (for ex. 4 motors in four wheels of a car) implies that theoretically, the power consumption should equally distributed between motors. But, for example, because of a flat tire one motor will draw a lot more power than the others.

There might be more parameters relevant for finding the optimal route, and the system can be modified to meet specific requirements of the user. After comparison of all routes based on calculation of energy consumption by the motor, the system provides available routes and information regarding length of each route, time to complete the route considering present status of the road, and energy that will be consumed by the vehicle along each route. The user then will be able to choose his or her preferable option.

Although embodiments of the invention have been described by way of illustration, it will be understood that the invention may be carried out with many variations, modifications, and adaptations, without exceeding the scope of the claims.

The invention claimed is:

1. A method for predicting the power required by an autonomous robot having three-dimensional movement capability thereby enabling it to carry out a task by traveling along the ground and up and along the shelves in a warehouse, the method comprising:
   (i) perform an initial learning stage in which data collection is carried out for a pre-defined period of time in order to build a power consumption database in a central processing server in the warehouse that is configured to communicate with the autonomous robot, wherein the data collected comprises:
      (a) power consumption of all electric motors configured to drive and to steer drive wheels of the autonomous robot when travelling along the ground and travelling on vertical and horizontal sections of a rail network and wherein the rail network is attached to shelves of an existing shelving system or is a free-standing structure standing next to an existing shelving system in the warehouse or is manufactured as an integral feature of the shelving system in the warehouse;
      (b) power consumption per rotatable junction at intersections of vertical and horizontal rails;
      (c) power consumption required to make turns on the floor; and
      (d) power consumption of all electric motors that activate a mechanism on the autonomous robot configured for picking and placing boxes;
   wherein power consumption is measured by sensors configured to measure and record power consumption of each one of the electric motors as a function of Stock Keeping Units (SKU) of the box carried by the robot and:
      (a.i) distance travelled on the ground, on vertical sections of the rail network, and on horizontal sections of the rail network;
      (a.ii) vertical and horizontal distances that the mechanism moves to pick/place the box;
      (a.iii) power required to make turns of different angles on the ground;
      (a.iv) power required to rotate a rail junction; and
      (a.v) age of the electric motor;
   (ii) activate a route distance calculation algorithm in the central processing server for a specific mission to:
      (a) draw data from a geographic map database in the central processing server, comprising information relating to the physical layout of the warehouse including the location of the autonomous robot in order to determine several alternate routes that the autonomous robot is able to travel from its present location in order to carry out the mission;
      (b) parse each of the several alternate routes into distance travelled on the ground, travelled on vertical rails, and travelled on horizontal rails; and
      (c) send the parsed distances from the route distance calculation algorithm to a power consumption calculation algorithm in the central processing server;
   (iii) activate the power consumption calculation algorithm to draw power consumption data from the power consumption database, wherein the data is appropriate for the SKU of the box the autonomous robot will be required to carry on each of the parsed sections of each of the alternate routes;
   (iv) activate the power consumption calculation algorithm to multiply the power consumption data by the length of each of the parsed sections, the number and angles of rotations on the ground, the power required to lift and move the box onto or off the robot, and the number of rotations of the junctions and to add the results of the multiplications to determine the total power consumption required for each of the electric motors on the autonomous robot for each of the alternate routes; and
   (v) activate the power consumption calculation algorithm to add together the total power consumption required for each of the electric motors on the autonomous robot to determine the total power required for the autonomous robot to carry out the mission by following each of the alternate routes.

2. The method of claim 1, wherein after the initial data collection stage, power consumption data is continually collected on the autonomous robot and periodically transferred to the power consumption database to update the information stored therein.

3. The method of claim 1, wherein historical records in the power consumption database are compared to present power consumption to monitor at least one of: the condition of the paths on the ground and segments of rail that the autonomous robot is travelling upon, the condition of the batteries, and the life cycle of specific components of the autonomous robot.

4. The method of claim 1, wherein historical records in the power consumption database are compared to present power consumption to determine a policy of service and preventive maintenance procedures of the autonomous robot.

5. The method of claim 1, wherein the data in the power consumption database is used to help to determine which autonomous robot should be assigned to a specific task.

\* \* \* \* \*